(12) United States Patent
Kimoto et al.

(10) Patent No.: US 12,476,593 B2
(45) Date of Patent: Nov. 18, 2025

(54) ELECTRONIC APPARATUS AND SIGNAL PROCESSING METHOD

(71) Applicant: KABUSHIKI KAISHA TOSHIBA, Tokyo (JP)

(72) Inventors: Yoshimasa Kimoto, Kawasaki Kanagawa (JP); Yoshimasa Egashira, Kawasaki Kanagawa (JP); Keiichi Yamaguchi, Kawasaki Kanagawa (JP); Takayuki Kato, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 414 days.

(21) Appl. No.: 18/179,419

(22) Filed: Mar. 7, 2023

(65) Prior Publication Data

US 2024/0080001 A1    Mar. 7, 2024

(30) Foreign Application Priority Data

Sep. 6, 2022 (JP) .................. 2022-141574

(51) Int. Cl.
*H03F 1/32* (2006.01)
*H03F 3/24* (2006.01)
*H04B 1/04* (2006.01)

(52) U.S. Cl.
CPC .......... *H03F 1/3247* (2013.01); *H03F 3/245* (2013.01); *H04B 1/0475* (2013.01); *H03F 2200/336* (2013.01); *H04B 2001/0425* (2013.01)

(58) Field of Classification Search
CPC ........................................................ H03F 1/32
USPC ........................................................ 330/149
See application file for complete search history.

(56) References Cited

PUBLICATIONS

Ma, et al., "Test Bed for Characterization and Predistortion of Power Amplifiers", International Journal of RF and Microwave Computer-Aided Engineering 23(1): 74-82.

*Primary Examiner* — Henry Choe
(74) *Attorney, Agent, or Firm* — Holtz, Holtz & Volek PC

(57) ABSTRACT

An electronic apparatus according to one embodiment, includes: a signal generator generating a first signal and a second signal; a first characteristic circuitry acquiring first and second distorted signals by giving first and second distortion characteristic to the first and second signals; a first time-characteristic circuitry acquiring a third distorted signal by giving a first time-characteristic to the first distorted signal and acquiring a fourth distorted signal by giving a second time-characteristic to the second distorted signal; a second characteristic circuitry acquiring a fifth distorted signal by giving a second distortion characteristic to the third distorted signal, and acquiring a sixth distorted signal by giving the second distortion characteristic to the fourth distorted signal; and a processing circuitry estimating at least one of the first distortion characteristic and the second distortion characteristic based on the first signal, the second signal, the fifth distorted signal, and the sixth distorted signal.

21 Claims, 9 Drawing Sheets

ELECTRONIC APPARATUS AND SIGNAL PROCESSING METHOD

CROSS REFERENCE TO RELATED APPLICATIONS

This application is based upon and claims the benefit of priority from the prior Japanese Patent Application No. 2022-141574, filed on Sep. 6, 2022, the entire contents of which are incorporated herein by reference.

FIELD

Embodiments described herein to an electronic apparatus and a signal processing method.

BACKGROUND

On a transmitter that conducts radio communications, some of signals transmitted from a transmission system, are looped back as loop back (LB) signals for the purpose of distortion compensation of transmit signals, etc. The signals (LB signals) that are looped back are acquired through a reception system circuit for exclusive use of the LB signals. Therefore, the acquired LB signals contain not only frequency characteristic of the transmission system circuit (distortion characteristic of the transmission system), but also frequency characteristic of the LB system circuit (distortion characteristic of the LB system).

In a cellular network or television broadcasting, there is demand for broader-band and stabler communications. In the case of a broadband communication system, on a transmitter that conducts radio communications, distortion caused by transmission system frequency characteristic cannot be ignored. However, even if LB signals are used to estimate and compensate for the distortion, although the product of the distortion characteristic of the transmission system and the distortion characteristic of the LB system can be estimated, the distortion characteristic of the two systems cannot be estimated individually.

Besides, a power amplifier (PA) is generally used in the broadband communications system, but because the PA distorts signals with time, in order to make distortion compensation stably, it is necessary to loop back output from the PA (PA output) and make distortion compensation while monitoring the situation of distortion compensation. To monitor the situation of distortion compensation, it is necessary to estimate accurate PA output. To estimate accurate PA output, it is also necessary to estimate the distortion characteristic of the transmission system and the distortion characteristic of the LB system separately.

DETAILED DESCRIPTION

According to one embodiment, an electronic apparatus comprising:
  a signal generating circuitry configured to generate a first signal and a second signal;
  a first characteristic circuitry configured to acquire a first distorted signal by giving a first distortion characteristic to the first signal, and acquire a second distorted signal by giving the first distortion characteristic to the second signal;
  a first time-characteristic circuitry configured to acquire a third distorted signal by giving a first time-characteristic, which is a distortion characteristic that changes with time, to the first distorted signal and acquire a fourth distorted signal by giving a second time-characteristic, which is different from the first time-characteristic and is a distortion characteristic that changes with time, to the second distorted signal;
  a second characteristic circuitry configured to acquire a fifth distorted signal by giving a second distortion characteristic to the third distorted signal, and acquire a sixth distorted signal by giving the second distortion characteristic to the fourth distorted signal; and
  a processing circuitry configured to estimate at least one of the first distortion characteristic and the second distortion characteristic based on the first signal, the second signal, the fifth distorted signal, and the sixth distorted signal.

Embodiments of the present invention will be described below with reference to the drawings.

First Embodiment

Figure 1:
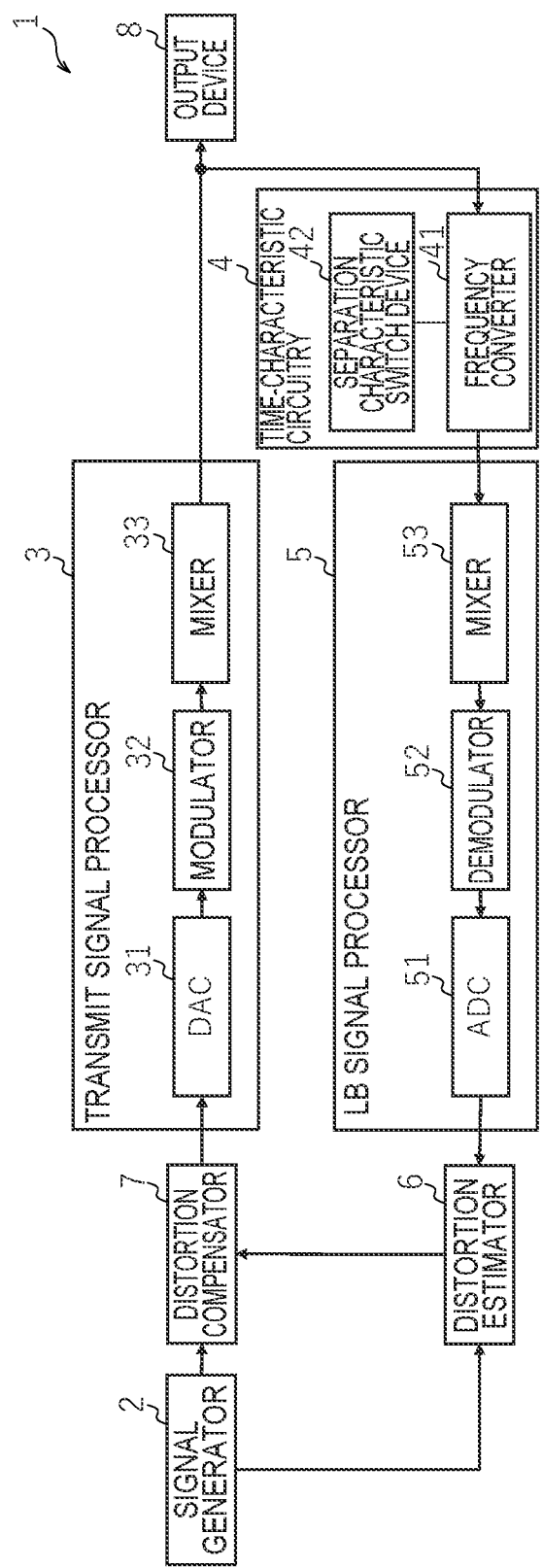
FIG. 1 is a block diagram of a signal processing apparatus according to a first embodiment.

FIG. 1 is a block diagram showing a signal processing apparatus 1, which is an electronic apparatus according to a first embodiment. The signal processing apparatus 1 is an electronic apparatus that includes a signal generator 2, a transmit signal processor 3, a time-characteristic circuitry 4, an LB signal processor 5, a distortion estimator 6 (or a processing circuitry), a distortion compensator 7 (or a distortion compensating circuitry), and an output device 8 (or an output circuitry). According to the first embodiment, regardless of signal bands, frequency characteristic unique to the transmit signal processor 3 (distortion characteristic of a transmission system) are estimated. The signal generator 2 corresponds to a signal generating circuitry, the distortion estimator 6 corresponds to a processing circuitry, a distortion compensator 7 corresponds to a distortion compensating circuitry, and an output device 8 corresponds to an output circuitry.

According to the present embodiment, a factor that distorts a signal on a frequency axis and/or a time axis is referred to as a "characteristic" or a "distortion characteristic." Also, according to the present embodiment, an element that has a function to distort a signal (cause distortion to the signal) by giving some characteristic to the signal, and output a distorted signal is referred to as a "characteristic circuitry." The act of "giving a characteristic to a signal" can be modeled, for example, by multiplying the signal by a matrix or a value defined according to the characteristic. The transmit signal processor 3, the time-characteristic circuitry 4, and the LB signal processor 5 all correspond to characteristic circuitries according to the present embodiment.

Figure 2:
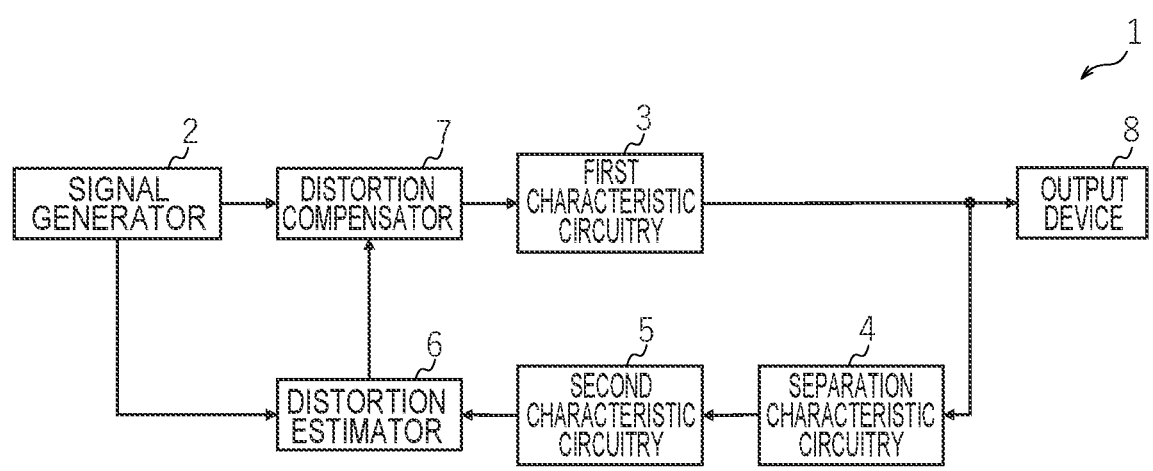
FIG. 2 is a block diagram showing another representation of the signal processing apparatus according to the first embodiment.

FIG. 2 is a block diagram of the signal processing apparatus 1 when each of the transmit signal processor 3, the time-characteristic circuitry 4, and the LB signal processor 5 is viewed as a characteristic circuitry or a characteristic processor. A first characteristic circuitry 3 corresponds to the transmit signal processor 3, a second characteristic circuitry 5 corresponds to the LB signal processor 5, and the time-characteristic circuitry 4 corresponds to a separation characteristic circuitry 4. That is, according to the first embodiment, the first characteristic circuitry 3 corresponds to the transmit signal processor 3 that performs various processes for signal transmission using elements 31 to 33, and the second characteristic circuitry 5 corresponds to the LB signal processor 5 that performs various processes for LB signal acquisition using elements 51 to 53. The separation characteristic circuitry 4 corresponds to the time-characteristic circuitry 4 that makes it possible to separately estimate the distortion characteristic of the transmission system and the distortion characteristic of the loop-back system by performing a process, which is a feature of the present embodiment, i.e., the process of giving a time-varying distortion characteristic.

At least part of the signal generator 2, the transmit signal processor (the first characteristic circuitry) 3, the time-characteristic circuitry (separation characteristic circuitry) 4, the LB signal processor (second characteristic circuitry) 5, the distortion estimator 6, the distortion compensator 7, and the output device 8 may be made up of circuits or processors such as ASICs (application specific integrated circuits) or FPGAs (Field-Programmable Gate Arrays). Alternatively, all or part of these elements may be implemented by a CPU that executes programs.

The signal generator 2 generates signals including a signal (digital signal) $X_1$ and a signal (digital signal) $X_2$. The signal $X_1$ and the signal $X_2$ differ in time. The signal generator 2 may switch output between the signal $X_1$ and the signal $X_2$ with time. The signal generator 2 may divide a single signal into the signal $X_1$ and the signal $X_2$. Hereinafter, when there is no need to distinguish between the signal $X_1$ and the signal $X_2$, the signal $X_1$ and the signal $X_2$ may be referred to simply as the signal X. The signal $X_1$ and the signal $X_2$ are examples of a first signal and a second signal according to the present embodiment, respectively.

The signal X is represented by an N-by-M matrix such as expressed by Expression 1, where N is the number in a time direction and M is the number in a series direction. One element contained in the matrix X represents one signal. The signal X has a certain bandwidth and one column of the matrix X represents time variation of the signal having the bandwidth. That is, one column of the matrix X contains N signals that changes with time. In the series direction, the signal X contains plural (M) sets of N signals changing in the time direction in this way. Increases in the number of columns contained in the signal X result in improvement of an SN ratio of processes performed by the distortion estimator 6 described later. The signal $X_1$ and the signal $X_2$ may be signals expressed by matrices $X_1$ and $X_2$ different from each other or signals expressed by the same matrix X. The matrices $X_1$ and $X_2$ different from each other need to be equal in the number of rows, but does not have to be equal in the number of columns (number of signals).

[Exp. 1]

$$= \begin{vmatrix} x_{1,1} & x_{1,2} & \cdots & x_{1,M-1} & x_{1,M} \\ x_{2,1} & x_{2,2} & \cdots & x_{2,M-1} & x_{2,M} \\ \vdots & \vdots & \ddots & \vdots & \vdots \\ x_{N-1,1} & x_{N-1,2} & \cdots & x_{N-1,M-1} & x_{N-1,M} \\ x_{N,1} & x_{N,2} & \cdots & x_{N,M-1} & x_{N,M} \end{vmatrix} \quad (1)$$

The transmit signal processor 3 includes a D/A converter (DAC) 31, a modulator 32, and a mixer 33 as shown in FIG. 1. The D/A converter 31 converts the signal X from a digital signal into an analog signal. The modulator 32 modulates the signal X. The mixer 33 performs frequency conversion (up-conversion) of the signal X from the baseband (BB) to the RF (Radio Frequency) band using a local oscillation signal generated by a local oscillator (not shown). For example, the mixer 33 performs frequency conversion of the signal X to the Ku-band.

When the transmit signal processor 3 performs the above processes on the signal X, a transmission system frequency characteristic originating in the elements 31 to 33 of the transmit signal processor 3 distorts the signal X. That is, when the transmit signal processor 3 is seen as a characteristic circuitry, the transmit signal processor 3 functions as the first characteristic circuitry 3 (see FIG. 2) that gives the transmission system frequency characteristic (first characteristic or first distortion characteristic) $H_t$ to the signal X generated by the signal generator 2 and outputs a signal $H_tX$.

The first characteristic $H_t$ is expressed by an N-by-N matrix. The first characteristic $H_t$ applies an affine transformation to the signal on the frequency axis. That is, the first characteristic $H_t$ causes linear distortion on the frequency axis to the signal. For example, the first characteristic $H_t$ includes a DC offset, which is a direct-current noise component. The first characteristic $H_t$ may be an IQ imbalance of the modulator 32.

Part of the signal outputted from the transmit signal processor 3 is fed back (looped back) and inputted to the time-characteristic circuitry 4.

The rest of the signal outputted from the transmit signal processor 3 is inputted to the output device 8. The output device 8 outputs (transmits) the signal processed by the transmit signal processor 3. The output device 8 is, for example, an antenna or a circuit that includes an antenna.

As shown in FIG. 1, the time-characteristic circuitry 4 (separation characteristic circuitry 4) includes a frequency converter 41 such as a mixer, and a separation characteristic switch device 42. The frequency converter 41 generates a characteristic D. The characteristic D is intended to make distortion characteristic of the transmission system and the distortion characteristic of the loop-back system acquirable by separating the distortion characteristic of the two systems, and in view of this purpose, hereinafter, the characteristic D will be referred to as a "separation characteristic D."

The separation characteristic switch device 42 switches the separation characteristic D generated by the frequency converter 41 between a separation characteristic $D_p$ and a separation characteristic $D_q$. The separation characteristic switch device 42 switches between the separation characteristic $D_p$ and the separation characteristic $D_q$ according to the time of day. Hereinafter, when there is no need to distinguish between the separation characteristic $D_p$ and the separation characteristic $D_q$, the separation characteristic $D_p$ and the separation characteristic $D_q$ may be referred to simply as the separation characteristic D. The separation characteristic is a distortion characteristic that changes with time and is also referred to as a time-characteristic. In this case, for example, the separation characteristic $D_p$ corresponds to a first time-characteristic, and the separation characteristic $D_q$ corresponds to a second time-characteristic.

The time-characteristic circuitry 4 (separation characteristic circuitry 4) multiplies a signal $H_tX_1$ (first distorted signal) and signal $H_tX_2$ (second distorted signal) outputted from the first characteristic circuitry 3 by the separation characteristic $D_p$ and the separation characteristic $D_q$, respectively, and outputs a signal $D_pH_tX_1$ and a signal $D_qH_tX_2$.

The separation characteristic $D_p$ and the separation characteristic $D_q$ are examples of a first separation characteristic (first time-characteristic) and a second separation characteristic (second time-characteristic) according to the present embodiment, respectively. The signal $D_pH_tX_1$ and the signal $D_qH_tX_2$ are examples of a third distorted signal and a fourth distorted signal according to the present embodiment, respectively.

The separation characteristic D is expressed by an N-by-N diagonal matrix and changes with time. That is, $D=\text{diag}[d_1, d_2, d_3, \ldots, d_N]$, and if the elements of $D_p$ and $D_q$ are expressed as $d_{\{p,n\}}$ and $d_{\{q,n\}}$, respectively, at least two of the quotients $d_{\{p,n\}}/d_{\{q,n\}}$ ($D_{q-p}$ described later) of $D_p$ and $D_q$ on an element by element basis differ from each other. The number of elements (unique elements) differing from the other elements corresponds to a resolution of the frequency characteristic (first characteristic and/or second characteristic) desired to be found. The separation characteristic D does not depend on an input signal. Desirably, the separation characteristic $D_p$ and the separation characteristic $D_q$ are in orthogonal relationship.

Examples of the separation characteristic $D_p$ and separation characteristic $D_q$ generated by the frequency converter 41 are expressed as shown in Expressions 2 and 3.

[Exp. 2]

$$D_p = \text{diag}[e^{j2\pi\Delta f_1/f_s}, e^{j4\pi\Delta f_1/f_s}, e^{j6\pi\Delta f_1/f_s}, \ldots, e^{j2N\pi\Delta f_1/f_s}] \quad (2)$$

[Exp. 3]

$$D_q = \text{diag}[e^{j2\pi\Delta f_2/f_s}, e^{j4\pi\Delta f_2/f_s}, e^{j6\pi\Delta f_2/f_s}, \ldots, e^{j2N\pi\Delta f_2/f_s}] \quad (3)$$

Where $f_s$ is a sampling frequency of DAC 31 and ADC 51 (described later). Although the sampling frequencies of DAC 31 and ADC 51 are equal here, they do not necessarily have to be equal. The frequency converter 41 changes, with time, the amount of frequency shift given to the signal X: such as $2\Delta f$, $4\Delta f$, $6\Delta f$, . . . . The separation characteristic switch device 42 switches the unit $\Delta f$ of the frequency shift amount of the frequency converter 41 between $\Delta f_1$ and $\Delta f_2$ ($\Delta f_1 \neq \Delta f_2$) and thereby generates the separation characteristic $D_p$ and separation characteristic $D_q$.

As described later, $D_p^{-1}D_q$ is written as a separation characteristic $D_{q-p}$. The separation characteristic $D_{q-p}$ is given by Expression 4.

[Exp. 4]

$$D_{q-p} = \text{diag}[e^{j2\pi(\Delta f_2 - \Delta f_1)/f_s}, e^{j4\pi(\Delta f_2 - \Delta f_1)/f_s}, e^{j6\pi(\Delta f_2 - \Delta f_1)/f_s}, \ldots, e^{j2N\pi(\Delta f_2 - \Delta f_1)/f_s}] \quad (4)$$

As shown in FIG. 1, the LB signal processor 5 includes, for example, an A/D converter (ADC) 51, a demodulator 52, and a mixer 53. The mixer 53 performs frequency conversion (down conversion) of a signal $DH_tX$ from the RF band to the BB band using a local oscillation signal generated by a local oscillator. The demodulator 52 demodulates the frequency-converted signal $DH_tX$. The A/D converter 51 converts the demodulated signal $DH_tX$ from analog to digital.

When the LB signal processor 5 performs the above processes on the signal $DH_tX$, an LB system frequency characteristic originating in the elements 51 to 53 of the LB signal processor 5 distorts the signal $DH_tX$. That is, when the LB signal processor 5 is seen as a characteristic circuitry, the LB signal processor 5 functions as the second characteristic circuitry 5 (see FIG. 2) that gives the LB system frequency characteristic (second characteristic or second distortion characteristic) $H_r$ to the signal $DH_tX$ and outputs a signal $H_rDH_tX$.

The second characteristic $H_r$ is expressed by an N-by-N matrix. The second characteristic $H_r$ applies an affine transformation to the signal on the frequency axis. That is, the second characteristic $H_r$ causes linear distortion on the frequency axis to the signal. For example, the second characteristic $H_r$ can include a DC offset, which is a direct-current noise component. The second characteristic $H_r$ may be an IQ imbalance of the demodulator 52.

The transmit signal processor 3 and/or the LB signal processor 5 may be equipped with a filter (not shown) configured to attenuate a signal having any frequency component or equipped with other additional elements. The filter is placed, for example, for the purpose of removing noise and reducing the processing load of the distortion estimator 6. The filter is, for example, an LTI (liner time-invariant) filter such as a low-pass filter, a band-pass filter, a high-pass filter, an all-pass filter, or an anti-aliasing filter. The distortion estimator 6 acquires a signal $Z_1$ ($=H_rD_pH_tX_1$) and a signal $Z_2$ ($=H_rD_qH_tX_2$) from the LB signal processor 5. The signal $Z_1$ ($=H_rD_pH_tX_1$) corresponds to a fifth distorted signal and the signal $Z_2$ ($=H_rD_qH_tX_2$) corresponds to a sixth distorted signal.

The distortion estimator 6 cancels the second characteristic $H_r$ through a first arithmetic operation based on the signal $X_1$, the signal $X_2$, the signal $Z_1$, and the signal $Z_2$ and thereby estimates the first characteristic $H_t$ (first distortion characteristic). The distortion estimator 6 cancels the first characteristic $H_t$ through a second arithmetic operation based on the signal $X_1$, the signal $X_2$, the signal $Z_1$, and the signal $Z_2$ and thereby estimates the second characteristic $H_r$ (second distortion characteristic). The distortion estimator 6 conducts the following calculation using, for example, the least squares method. Hereinafter, when there is no need to distinguish between the signal $Z_1$ and the signal $Z_2$, the signal $Z_1$ and the signal $Z_2$ may be referred to simply as the signal Z.

The distortion estimator 6 calculates, for example, $X_1Z_1^{-1}Z_2X_2^{-1}$ from the signal $Z_1$ and the signal $Z_2$ and obtains Expression 5.

[Exp. 5]

$$X_1Z_1^{-1}Z_2X_2^{-1} = X_1X_1^{-1}H_t^{-1}D_p^{-1}H_r^{-1}H_rD_qH_tX_2X_2^{-1} = H_t^{-1}D_{q-p}H_t \quad (5)$$

Referring to Expression 5, the second characteristic $H_r$ has been canceled. Since $D_{q-p}$ is a diagonal matrix, for example, if $H_t^{-1}D_{q-p}H_t = A$, the first characteristic $H_t$ is estimated as an eigenvector of matrix A. Here, the separation characteristic D does not need to be known.

The distortion estimator 6 may estimate the second characteristic $H_r$ by canceling the first characteristic $H_t$ from the signal $Z_1$ and the signal $Z_2$. The distortion estimator 6 calculates, for example, $Z_2 X_2^{-1} X_1 Z_1^{-1}$ and thereby obtains Expression 6.

[Exp. 6]

$$Z_2 X_2^{-1} X_1 Z_1^{-1} = H_r D_q H_t X_2 X_2^{-1} X_1 X_1^{-1} H_t^{-1} D_p^{-1} H_r^{-1} = H_r D_{q-p} H_r^{-1} \quad (6)$$

Referring to Expression 6, the first characteristic $H_t$ has been canceled. Since $D_{q-p}$ is a diagonal matrix, for example, if $H_r D_{q-p} H_r^{-1} = B$, the second characteristic $H_r$ is estimated as an eigenvector of matrix B. Here, the separation characteristic D does not need to be known. Note that expressions used to derive the above characteristic are not limited to Expression 4 and Expression 5.

Note that in the processes performed by the distortion estimator 6, if the LB signal processor 5 is equipped with a filter, the signal X and the signal Z change in frequency band, and the signal X and the signal Z may differ in frequency band.

The first characteristic $H_t$ and the second characteristic $H_r$ can change with time due to temperature changes and the like. However, in this case again, the amounts of change in the first characteristic $H_t$ and the second characteristic $H_r$ per unit time are smaller than the amount of change in the separation characteristic D per unit time. Therefore, the first characteristic $H_t$ and the second characteristic $H_r$ can be treated as time-invariant in a time scale in which the separation characteristic D changes.

The first characteristic $H_t$ and the second characteristic $H_r$ may be estimated at fixed intervals (at a fixed frequency) during operation of the signal processing apparatus 1 or estimated once before shipment of the signal processing apparatus 1. At least one of the estimated first characteristic $H_t$ and the second characteristic $H_r$ may be stored in a storage device such as a memory accessible by the distortion compensator 7.

Based on the first characteristic $H_t$ estimated by the distortion estimator 6, the distortion compensator 7 performs digital predistortion (DPD) to precompensate the digital signal generated by the signal generator 2 for expected distortion. Specifically, the distortion compensator 7 performs the process of multiplying the digital signal generated by the signal generator 2 by the inverse matrix of the first characteristic $H_t$. This allows the output device 8 to output a signal compensated for distortion with high accuracy.

Variation 1

Figure 3:
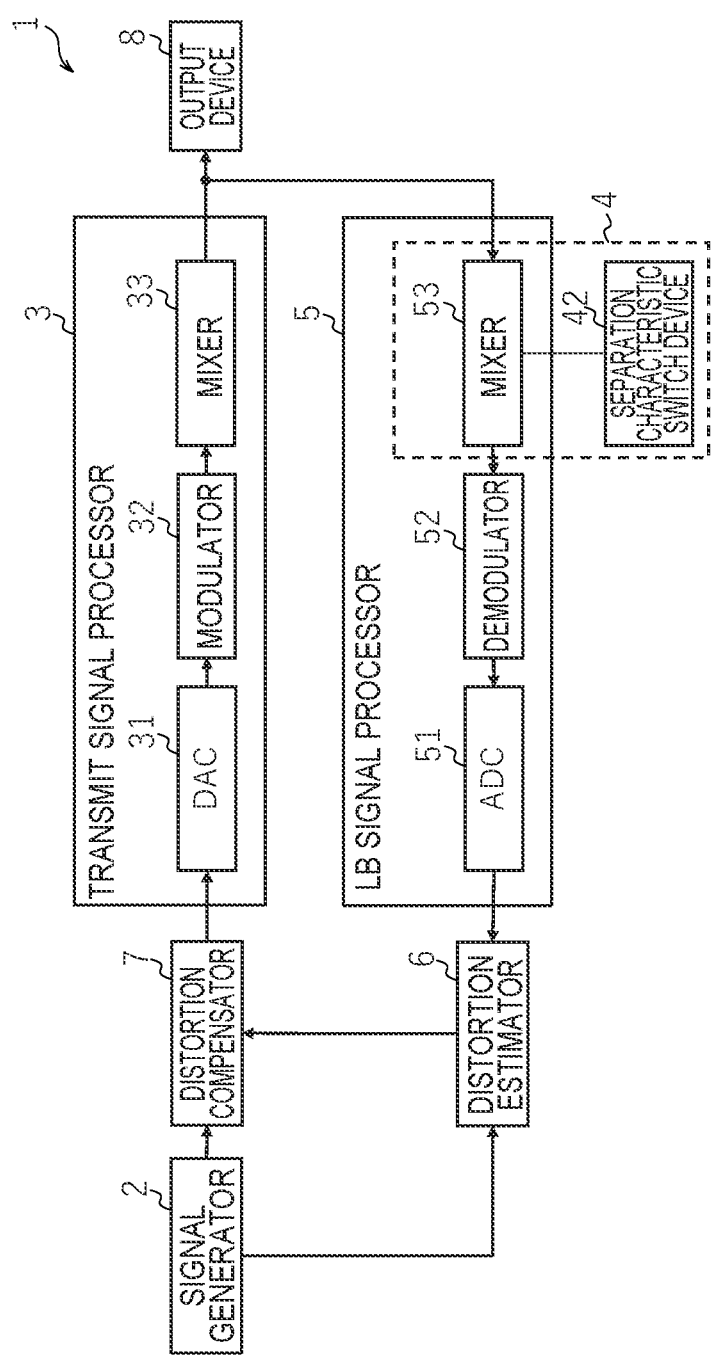
FIG. 3 is a block diagram showing a variation of the signal processing apparatus according to the first embodiment.

Whereas description has been given above of a case in which the separation characteristic circuitry 4 includes the frequency converter 41, as shown in FIG. 3, the mixer 53 provided in the second characteristic circuitry 5, may be included in the time-characteristic circuitry 4 (separation characteristic circuitry). When the mixer 53 is included in the time-characteristic circuitry 4, a characteristic $H_{up}$ given by the mixer 33 and a separation characteristic $D_{down}$ given by the mixer 53 are given by Expression 7 and Expression 8. The characteristic $H_{up}$ causes linear distortion to the signal on the frequency axis.

[Exp. 7]

$$H_{up} = \mathrm{diag}[e^{j2\pi f_0/f_s}, e^{j2\pi f_0/f_s}, e^{j2\pi f_0/f_s}, \ldots, e^{j2\pi f_0/f_s}] \quad (7)$$

[Exp. 8]

$$D_{down} = \mathrm{diag}[e^{-j2\pi(f_0-\Delta f)/f_s}, e^{-j4\pi(f_0-\Delta f)/f_s},$$
$$e^{-j6\pi(f_0-\Delta f)/f_s}, \ldots, e^{-j2N\pi(f_0-\Delta f)/f_s}] \quad (8)$$

Where $f_0$ is an amount of frequency shift caused by up-conversion performed by the mixer 33, and $f_s$ is a sampling frequency of the mixer 33 and mixer 53. $\Delta f$ is an adjustment amount for the frequency shift amount given by the mixer 53. The separation characteristic switch device 42 switches the adjustment amount $\Delta f$ for the frequency shift amount between $\Delta f_1$ and $\Delta f_2$ and thereby generates the separation characteristic $D_p$ and separation characteristic $D_q$ similar to Expression 2 and Expression 3.

The separation characteristic (time-characteristic) may be of any type as long as it changes, with time, at least one of the phase, amplitude, frequency, and impulse response of an inputted signal.

Variation 2

Figure 4:
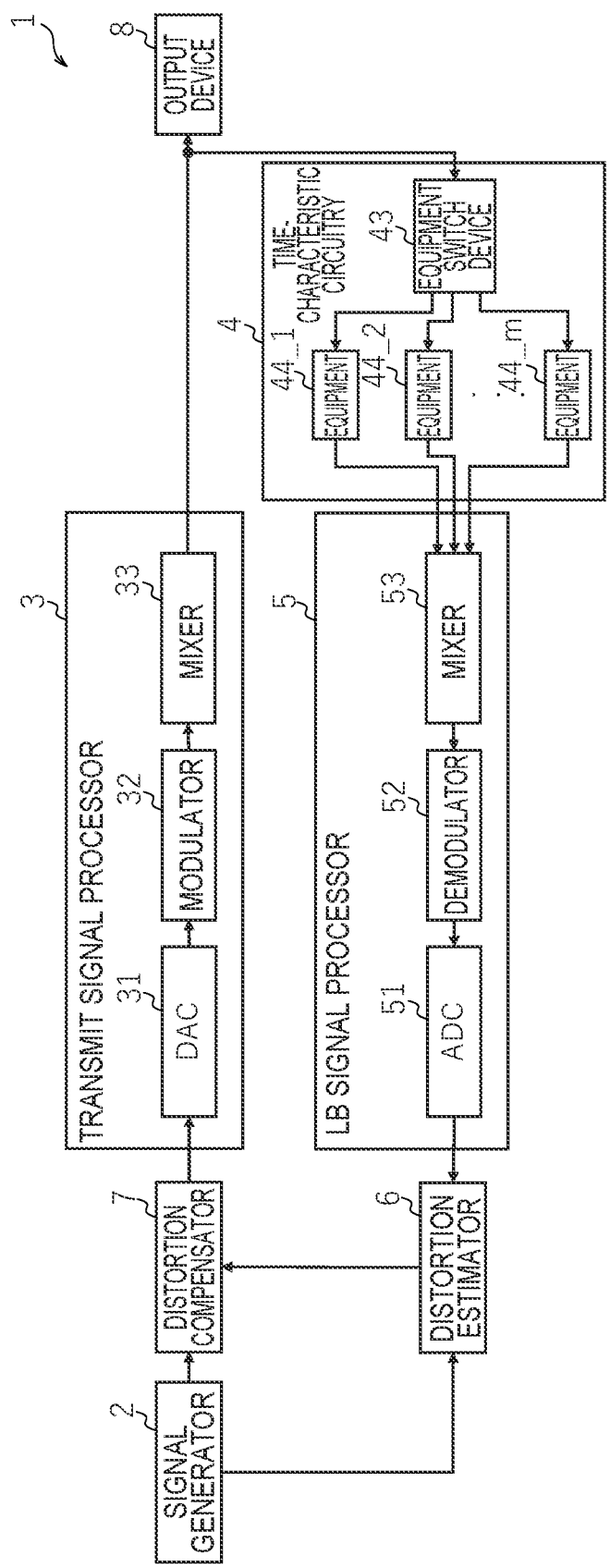
FIG. 4 is a block diagram showing another variation of the signal processing apparatus according to the first embodiment.

As shown in FIG. 4, the time-characteristic circuitry 4 (separation characteristic circuitry) may include an equipment switch device 43 and multiple pieces of equipment 44_1 to 44_m. Any one piece of equipment is denoted by equipment 44. One piece of equipment 44 changes at least one of the phase, amplitude, frequency, and impulse response of an inputted signal. It is not necessary that all the equipment 44 has the same function. For example, equipment 44 that changes the phase of an inputted signal and equipment 44 that changes the amplitude of the inputted signal may coexist. The equipment switch device 43 temporally switches the equipment 44 that is to act on an inputted signal and outputs a signal inputted to selected equipment 44. The equipment switch device 43 is, for example, a multiplexer or a divider. Whereas in the configuration of FIG. 4, the inputted signal is outputted to one piece of equipment 44 selected by the equipment switch device 43, the inputted signal may be outputted to all the pieces of equipment 44_1 to 44_m and the equipment switch device 43 may select one of signals outputted from the equipment 44_1 to 44_m. In this case, for example, the equipment switch device 43 may be located between the equipment 44_1 to 44_m and the LB signal processor 5.

By making the equipment switch device 43 temporally switch the equipment 44 that is to act on an inputted signal, the time-characteristic circuitry 4 gives a separation characteristic to the inputted signal. Also, since the signal X is represented by an N-by-M matrix, the equipment switch device 43 needs to switch the equipment 44 N times, but the same equipment 44 may be selected multiple times. That is, there is no need that there be N pieces of equipment 44.

The time-characteristic circuitry 4 may include equipment configured to add noise changing with time to a local oscillation signal generated by a local oscillator used for frequency conversion. The time-characteristic circuitry 4 may include an amplifier (variable-gain amplifier) that changes the amplitude of an inputted signal with time. The time-characteristic circuitry 4 may include a power amplifier that amplifies an inputted signal while distorting the signal with time during amplification.

If the separation characteristic given by the time-characteristic circuitry 4 changes at least one of properties of an inputted signal with time, except for its frequency, the separation characteristic switch device 42 may temporally divides one separation characteristic into two: the separation characteristic $D_p$ and the separation characteristic $D_q$.

Figure 5:
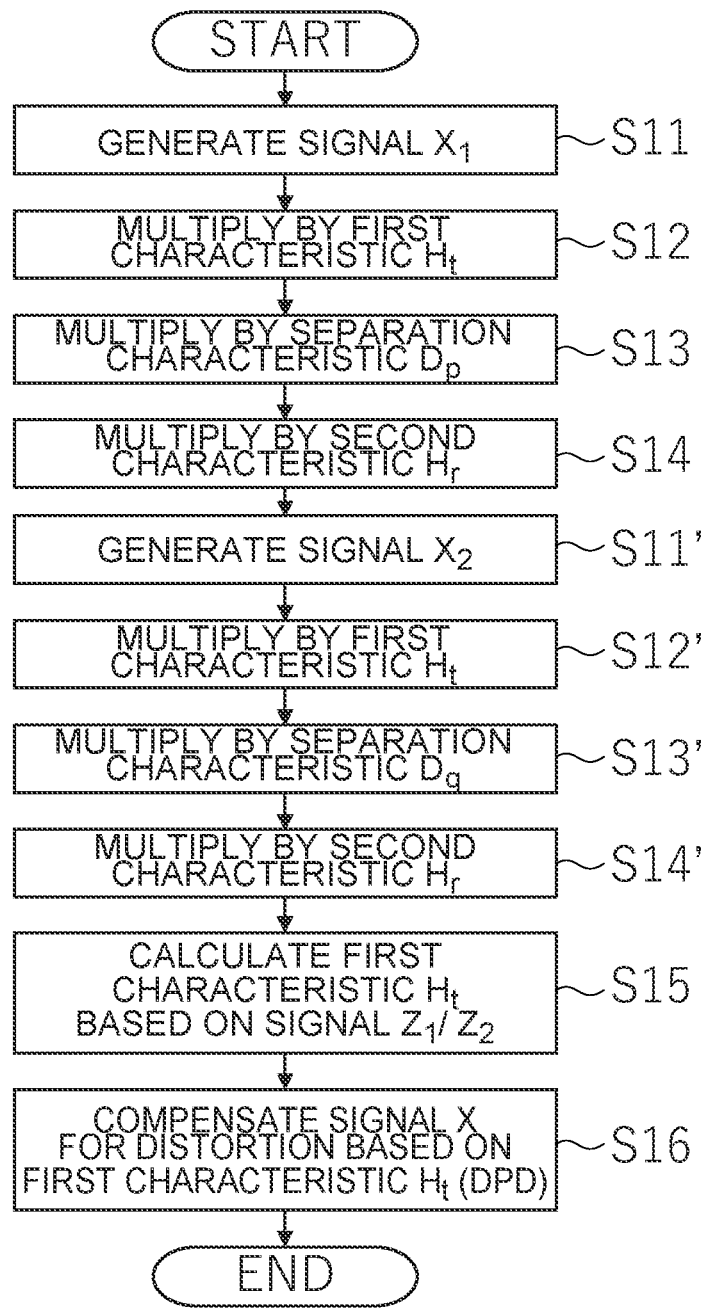
FIG. 5 is a flowchart describing a process performed by the signal processing apparatus according to the first embodiment.

FIG. 5 is a flowchart describing a process performed by the signal processing apparatus 1. The process performed by the signal processing apparatus 1 will be described below with reference to FIG. 5.

First, the signal generator 2 generates a signal $X_1$ (first signal) (step S11).

Next, the first characteristic circuitry 3 gives the first characteristic $H_t$ (first distortion characteristic) to the signal $X_1$ and outputs the signal $H_t X_1$ (first distorted signal) (step S12).

Next, the time-characteristic circuitry 4 (separation characteristic circuitry) gives the separation characteristic $D_p$ (first time-characteristic) to the signal $H_t X_1$ and outputs the signal $D_p H_t X_1$ (third distorted signal) (step S13).

Next, the second characteristic circuitry 5 gives the second characteristic $H_r$ (third distortion characteristic) to the signal $D_p H_t X_1$ and outputs the signal $H_r D_p H_t X_1$ (fifth distorted signal) (step S14).

Next, the signal generator 2 generates a signal $X_2$ (second signal) and the elements perform processes similar to the processes performed on the signal $X_1$ (steps S11' to S14'). In so doing, the time-characteristic circuitry 4 has switched the separation characteristic $D_p$ to the separation characteristic $D_q$ (second time-characteristic). Note that any of steps S11' to S14' may be carried out concurrently with any of steps S11 to S14.

Next, the distortion estimator 6 estimates the first characteristic $H_t$ by canceling the second characteristic $H_r$ through a first arithmetic operation based on the signal $X_1$, the signal $X_2$, the signal $Z_1 = H_r D_p H_t X_1$ (fifth distorted signal), and the signal $Z_2 = H_r D_q H_t X_2$ (sixth distorted signal) (step S15).

Next, the distortion compensator 7 precompensates the signal generated by the signal generator 2 for expected distortion based on the first characteristic $H_t$ estimated by the distortion estimator 6 (step S16).

Thus, the first embodiment allows the first characteristic (transmission system frequency characteristic, first distortion characteristic) to be estimated separately regardless of signal bands. By compensating the signal generated by the signal generator for distortion based on the estimated first distortion characteristic, it is possible to output a low-distortion or distortion-free signal. Also, the first embodiment allows the second characteristic (loop-back system frequency characteristics second distortion characteristic) to be estimated separately regardless of signal bands. Furthermore, the first embodiment allows the first characteristic and the second characteristic to be estimated separately from each other regardless of signal bands.

Second Embodiment

Figure 6:
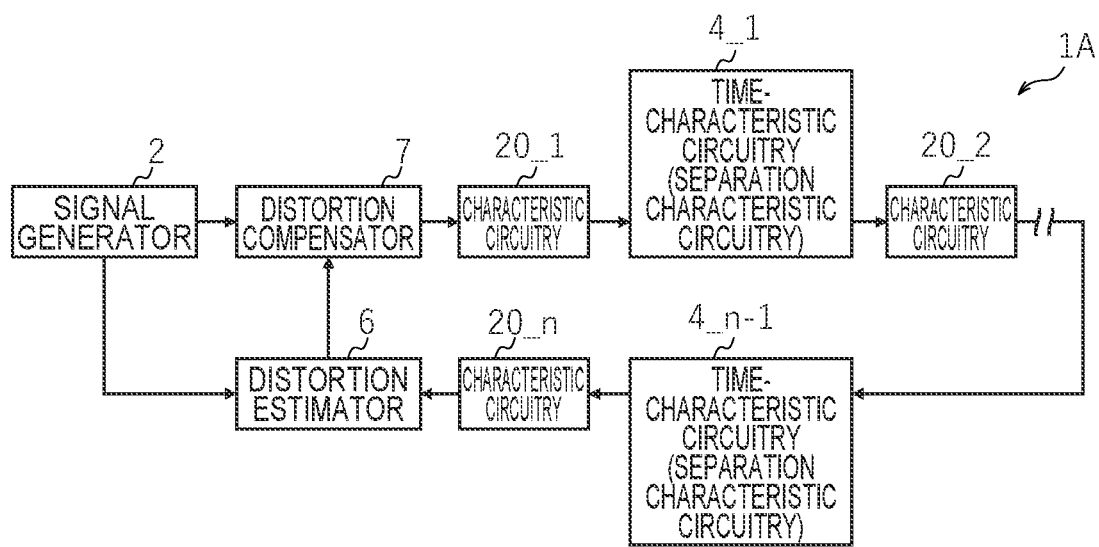
FIG. 6 is a block diagram of a signal processing apparatus according to a second embodiment.

FIG. 6 is a block diagram of a signal processing apparatus 1A as an electronic apparatus according to the present embodiment. Elements having the same names or functions as the first embodiment described above in FIG. 1 are denoted by the same reference signs as the corresponding elements in FIG. 1. Except changed or added items, description will be omitted below.

The signal processing apparatus 1A includes n characteristic circuitries 20_1 to 20_n (n≥3). For convenience of explanation, the side closer to the signal generator 2 along a signal path will be designated as the "front" and the side closer to the distortion estimator 6 will be designated as the "rear." Hereinafter, of the n characteristic circuitries, the ith characteristic circuitry from the front will be denoted as a characteristic circuitry 20_i (i=1 to n). As an example, the characteristic circuitry 20_1 corresponds to the first characteristic circuitry 3 in FIG. 2, the characteristic circuitry 20_n corresponds to the second characteristic circuitry 5 in FIG. 2, and other characteristic circuitries 20_2, 20_3, . . . correspond to one or more Mth characteristic circuitries differing from each other (M is an integer equal to or larger than 3).

Besides, plural time-characteristic circuitries 4_1 to 4_n−1 are provided. The time-characteristic circuitry 4_1 corresponds to the time-characteristic circuitry 4 (first time-characteristic circuitry) in FIG. 1. The time-characteristic circuitries 4_2, 4_3 . . . correspond to one or more Pth time-characteristic circuitries differing from each other (P is an integer equal to or larger than 2).

The one or more Mth characteristic circuitries and the one or more Pth time-characteristic circuitries are at least partially provided alternately between the time-characteristic circuitry 4_1 (which corresponds to the time-characteristic circuitry 4 in FIG. 1) and the characteristic circuitry 20_n (which corresponds to the second characteristic circuitry 5 in FIG. 2).

Although not illustrated in FIG. 5, the output device 8 is provided at the rear of any of the characteristic circuitries 20_i.

The characteristic circuitry 20_i gives a characteristic $H_i$ (distortion characteristic) to signals inputted from the time-characteristic circuitry or the characteristic circuitry 20_i−1 on the input side of the characteristic circuitry 20_i, more specifically, to two signals (distorted signals) inputted with time, and outputs the signals to the time-characteristic circuitry (separation characteristic circuitry) or the characteristic circuitry 20_i+1 on the output side. However, in the case of the characteristic circuitry 20_1, signals (first signal, second signal) are inputted from the signal generator 2. Additionally, the characteristic circuitry 20_n outputs signal to the distortion estimator 6. The characteristic $H_i$ applies an affine transformation to the inputted signals on the frequency axis. That is, the characteristic $H_i$ causes linear distortion on the frequency axis to the signals. For example, the characteristic $H_i$ includes a DC offset, which is a direct-current noise component. The characteristic $H_i$ may be an IQ imbalance described above. The Pth time-characteristic circuitry gives separation characteristic (time-characteristic) differing from each other to two signals inputted from any characteristic circuitry (distorted signals) on the input side, and outputs the signals to the Mth characteristic circuitry on the output side or the characteristic circuitry (characteristic circuitry 20_n) on the final stage.

Whereas according to the first embodiment, two characteristic circuitries, namely the first characteristic circuitry 3 and the second characteristic circuitry 5, cause linear distortion to signals, according to the second embodiment, three or more characteristic circuitries cause linear distortion to signals. That is, there are one or more characteristic circuitries (excluding the time-characteristic circuitries, i.e., the separation characteristic circuitries) other than the first characteristic circuitry 3 and the second characteristic circuitry 5. According to the second embodiment, the characteristic $H_i$ of any characteristic circuitry 20_i is estimated.

According to the present embodiment, it is assumed that the characteristic circuitry 20_1 corresponds to the first characteristic circuitry 3 in FIG. 2 and the characteristic circuitry 20_n corresponds to the second characteristic circuitry 5 in FIG. 2, but this is not restrictive. For example, the elements 31 to 33 of the first characteristic circuitry 3 may be treated as the characteristic circuitries 20_1 to 20_3, respectively. Alternatively, the characteristic circuitry 20_i may be an additional element such as a filter placed between any elements out of elements 2 to 6.

Hereinafter, the separation characteristic circuitry existing after (next) the characteristic circuitry 20_i will be referred to as a separation characteristic circuitry 4_i. The separation characteristic circuitry 4_i multiplies an inputted signal by a separation characteristic D.

giving a separation characteristic (time-characteristic), the separation characteristic circuitry 4_2 switches a separation characteristic $D_2$ between $D_p$ and $D_q$, and the distortion estimator 6 acquires the signal $Z_1$ and the signal $Z_2$. Then, using the already estimated characteristic $H_1$, the distortion estimator 6 calculates $H_1 X_1 Z_1^{-1} Z_2 X_2^{-1} H_1^{-1}$, and thereby obtains Expression 11. Since the separation characteristic circuitry 4_1 is not functioning, the separation characteristic $D_1$ becomes a simple unit matrix.

[Exp. 11]

$$\begin{aligned} H_1 X_1 Z_1^{-1} Z_2 X_2^{-1} H_1^{-1} &= H_1 X_1 X_1^{-1} H_1^{-1} D_1^{-1} H_2^{-1} D_p^{-1} H_3^{-1} H_3 D_q H_2 D_1 H_1 X_2 X_2^{-1} H_1^{-1} \\ &= D_1^{-1} H_2^{-1} D_p^{-1} D_q H_2 D_1 \\ &= H_2^{-1} D_{q-p} H_2 \end{aligned} \quad (11)$$

It is sufficient that the separation characteristic circuitries 4_i are placed at least in front of and behind the characteristic circuitry 20_i (excluding the characteristic circuitry 20_1 and the characteristic circuitry 20_n), of which a characteristic is desired to be estimated. That is, it is not always that there are n−1 separation characteristic circuitries 4_i. For example, if there is no need to estimate a characteristic $H_4$ of a characteristic circuitry 20_4, there is no need to place separation characteristic circuitries 4_3 and 4_4. However, when it is necessary to estimate a characteristic $H_5$ of a characteristic circuitry 20_5, it is necessary to place at least the separation characteristic circuitry 4_4.

As with the first embodiment, the distortion estimator 6 estimates characteristic of the characteristic circuitries 20_i. As an example, processes of the distortion estimator 6 will be described by setting n=3. The following description is also true when n≥4. When n=3, $Z = H_3 D_2 H_2 D_1 H_1 X$.

First, a separation characteristic circuitry 4_1 switches a separation characteristic $D_1$ between $D_p$ and $D_q$. Consequently, the distortion estimator 6 acquires the signal $Z_1$ and the signal $Z_2$, calculates $X_1 Z_1^{-1} Z_2 X_2^{-1}$, and thereby obtains Expression 9.

[Exp. 9]

$$\begin{aligned} X_1 Z_1^{-1} Z_2 X_2^{-1} &= X_1 X_1^{-1} H_1^{-1} D_p^{-1} H_2^{-1} D_2^{-1} H_3^{-1} H_3 D_2 H_2 D_q H_1 X_2 X_2^{-1} \\ &= H_1^{-1} D_p^{-1} D_q H_1 \\ &= H_1^{-1} D_{q-p} H_1 \end{aligned} \quad (9)$$

A characteristic $H_1$ is estimated from Expression 9.

Next, the separation characteristic circuitry 4_2 switches a separation characteristic $D_2$ between $D_p$ and $D_q$. Consequently, the distortion estimator 6 acquires the signal $Z_1$ and the signal $Z_2$, calculates $Z_2 X_2^{-1} X_1 Z_1^{-1}$, and thereby obtains Expression 10.

[Exp. 10]

$$\begin{aligned} Z_2 X_2^{-1} X_1 Z_1^{-1} &= H_3 D_q H_2 D_1 H_1 X_2 X_2^{-1} X_1 X_1^{-1} H_1^{-1} D_1^{-1} H_2^{-1} D_p^{-1} H_3^{-1} \\ &= H_3 D_q D_p^{-1} H_3^{-1} \\ &= H_3^{-1} D_{q-p} H_3 \end{aligned} \quad (10)$$

A characteristic $H_3$ is estimated from Expression 10.

Next, the distortion estimator 6 stops a function of the separation characteristic circuitry 4_1, i.e., the function of A characteristic $H_2$ is estimated from Expression 11. Note that the order in which the distortion estimator 6 estimates the characteristic $H_1$ to $H_3$ is not limited to the one described above. For example, the distortion estimator 6 may estimate the characteristic $H_2$ next the characteristic H1 or the characteristic H3 is estimated. Besides, expressions used to derive the characteristic are not limited to the expressions described above.

As described above, first the characteristic $H_1$ or the characteristic $H_n$ is estimated. Subsequently, all the characteristic $H_i$ are estimated one after another based on known characteristic $H_i$.

Thus, the second embodiment allows the characteristic of any characteristic circuitry to be estimated even if there are three or more characteristic circuitries.

Third Embodiment

Figure 7:
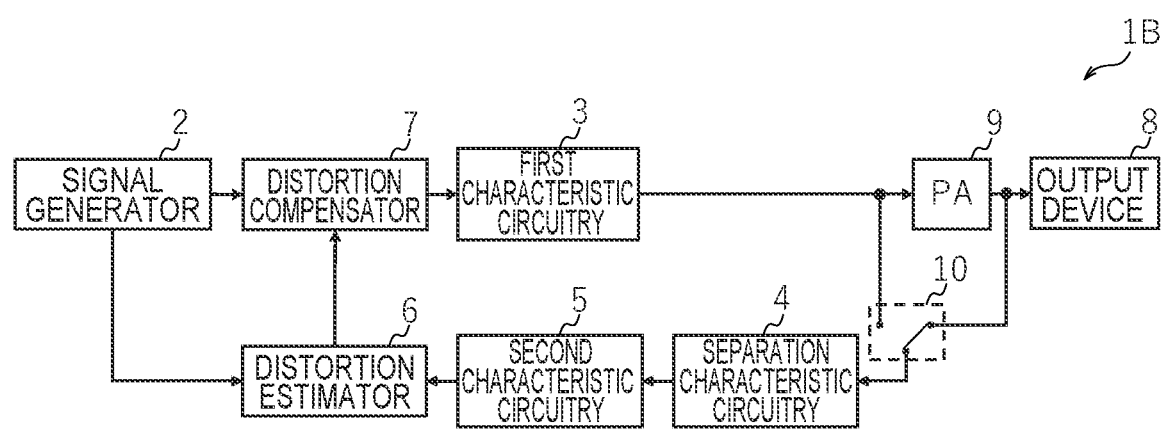
FIG. 7 is a block diagram of a signal processing apparatus according to a third embodiment.

FIG. 7 is a block diagram of a signal processing apparatus 1B as an electronic apparatus according to a third embodiment. Elements having the same names or functions as the first embodiment described above in FIG. 1 are denoted by the same reference signs as the corresponding elements in FIG. 1. In addition to the elements of the signal processing apparatus 1 according to the first embodiment, the signal processing apparatus 1B includes a switch device 10 (or a selecting circuitry), and also includes a power amplifier (PA) 9 (or an amplifier circuitry) as an amplifier. Except changed or added items, description will be omitted below. According to the third embodiment, DPD is performed in the presence of PA. The switch device 10 corresponds to a selecting circuitry, the PA 9 corresponds to an amplifier circuitry.

At least part of the PA 9 and the switch device 10 may be made up of circuits or processors such as ASICs (application specific integrated circuits) or FPGAs (Field-Programmable Gate Arrays). Alternatively, all or part of these elements may be implemented by a CPU that executes programs.

The PA 9 amplifies an inputted signal. The PA 9 is, for example, a compound semiconductor amplifier made of gallium nitride (GaN). In amplifying a signal, the PA 9 distorts the signal by giving a PA characteristic $H_{PA}$ to the signal.

The switch device 10 switches whether to feed back an output from the PA 9. The switch device 10 includes a switch and switches a connection using the switch. The switch can switch the connection between input and output sides of the PA 9.

First, the switch device 10 switches the connection to the input side of the PA 9 to disable the output from the PA 9 from being fed back. In this state, as with the first embodiment, the distortion estimator 6 estimates the first characteristic $H_t$.

Next, the switch device 10 switches the connection to the output side of the PA 9 to allow the output from the PA 9 to be fed back. In this state, the distortion estimator 6 estimates the product of the first characteristic $H_t$ and the PA characteristic $H_{PA}$.

When the output from the PA 9 is fed back, a signal $H_{PA}H_tX_1$ (seventh distorted signal) resulting from giving the first distortion characteristic of the first characteristic circuitry 3 and a characteristic of the PA 9 to a first signal $X_1$ is inputted to the time-characteristic circuitry (separation characteristic circuitry) 4. Also, a signal $H_{PA}H_tX_2$ (eighth distorted signal) resulting from giving the first distortion characteristic of the first characteristic circuitry 3 and the characteristic of the PA 9 to a second signal $X_2$ is inputted to the time-characteristic circuitry (separation characteristic circuitry) 4.

Then, the distortion estimator 6 acquires the signal $Z_1$ (=$H_rD_pH_{PA}H_tX_1$) and the signal $Z_2$ (=$H_rD_qH_{PA}H_tX_2$) from the LB signal processor 5. The distortion estimator 6 calculates, for example, $X_1Z_1^{-1}Z_2X_2^{-1}$ from the signal $Z_1$ and the signal $Z_2$ and obtains Expression 12.

[Exp. 12]

$$X_1Z_1^{-1}Z_2X_2^{-1} = \\ X_1X_1^{-1}H_t^{-1}H_{PA}^{-1}D_p^{-1}H_r^{-1}H_rD_qH_{PA}H_tX_2X_2^{-1} = H_t^{-1}H_{PA}^{-1}D_{q-p}H_{PA}H_t \quad (12)$$

The product of the first characteristic $H_t$ and the PA characteristic $H_{PA}$ is estimated from Exp. 12. Then, the distortion estimator 6 estimates the PA characteristic $H_{PA}$ from the product of the first characteristic $H_t$ and the PA characteristic $H_{PA}$ as well as from the first characteristic $H_t$.

Based on the first characteristic $H_t$ and PA characteristic $H_{PA}$ estimated by the distortion estimator 6, the distortion compensator 7 performs DPD to pre-compensate the signal (third signal) generated by the signal generator 2 for expected distortion. Specifically, the distortion compensator 7 performs the process of multiplying the digital signal generated by the signal generator 2 by the inverse matrix of the first characteristic $H_t$ and the inverse matrix of the PA characteristic $H_{PA}$. Note that the signal generated by the signal generator 2 is a digital signal.

Desirably, during operation of the signal processing apparatus 1B, the distortion compensator 7 compensates the PA characteristic $H_{PA}$ for distortion at a fixed frequency in real time. In order to estimate the PA characteristic $H_{PA}$, it is necessary to estimate the first characteristic $H_t$, but because time variation of the first characteristic $H_t$ is relatively slow, it is not necessary to estimate the first characteristic $H_t$ as frequently as the PA characteristic $H_{PA}$. In that case, for example, during operation of the signal processing apparatus 1B, the distortion estimator 6 may reduce the processing load of the distortion estimator 6 by reducing estimation frequency of (or by not estimating) the first characteristic $H_t$ whose time variation is relatively slow.

The output device 8 outputs (transmits) the signal amplified by the PA 9. That is, the output device 8 outputs the signal (third signal) compensated by the distortion compensator 7, given the first distortion characteristic by the first characteristic circuitry 3, and amplified by the PA 9. When the output device 8 includes an antenna, the output device 8 radiates a radio wave into space based on the signal amplified by the PA 9.

Variation

Figure 8:
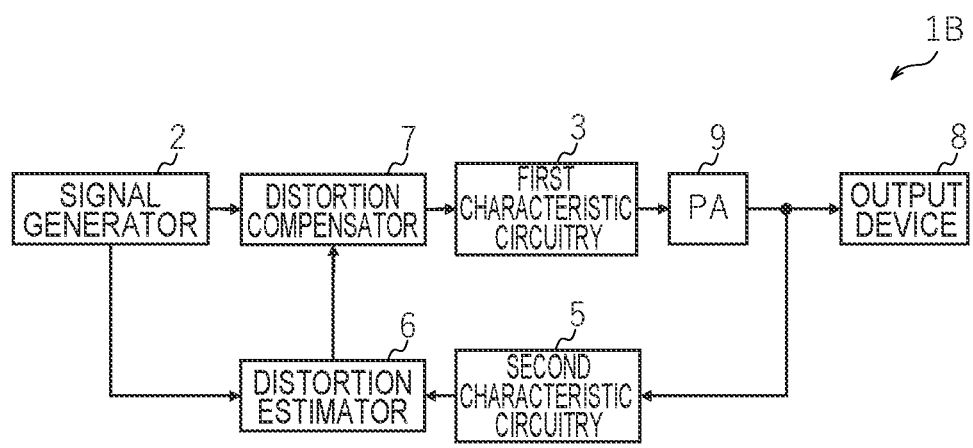
FIG. 8 is a block diagram showing a variation of the signal processing apparatus according to the third embodiment.

FIG. 8 shows a variation of the third embodiment. Whereas according to the above description, the PA 9 and the separation characteristic circuitry 4 are provided separately, the PA 9 may be caused to act as a separation characteristic circuitry as described earlier. When amplifying a signal, the PA 9 gives a PA characteristic $H_{PA}$ to the signal. The PA characteristic $H_{PA}$ is expressed by an N-by-N diagonal matrix and changes with time. The amount of change in the PA characteristic $H_{PA}$ per unit time is larger than the amounts of change in the first characteristic $H_t$ and the second characteristic $H_r$ per unit time. The PA characteristic $H_{PA}$ does not depend on an input signal. Therefore, the PA characteristic $H_{PA}$ also acts as a separation characteristic D.

For example, first the distortion estimator 6 estimates the first characteristic $H_t$ and the second characteristic $H_r$ by treating the PA characteristic $H_{PA}$ as a separation characteristic D. Next, the distortion estimator 6 estimates the PA characteristic $H_{PA}$ by canceling the first characteristic $H_t$ and the second characteristic $H_r$ from a signal multiplied by the first characteristic $H_t$, the second characteristic $H_r$, and the PA characteristic $H_{PA}$. If the distortion estimator 6 performs processing in this way, there is no need to newly add a separation characteristic circuitry 4 and DPD is performed with a simpler configuration.

Figure 9:
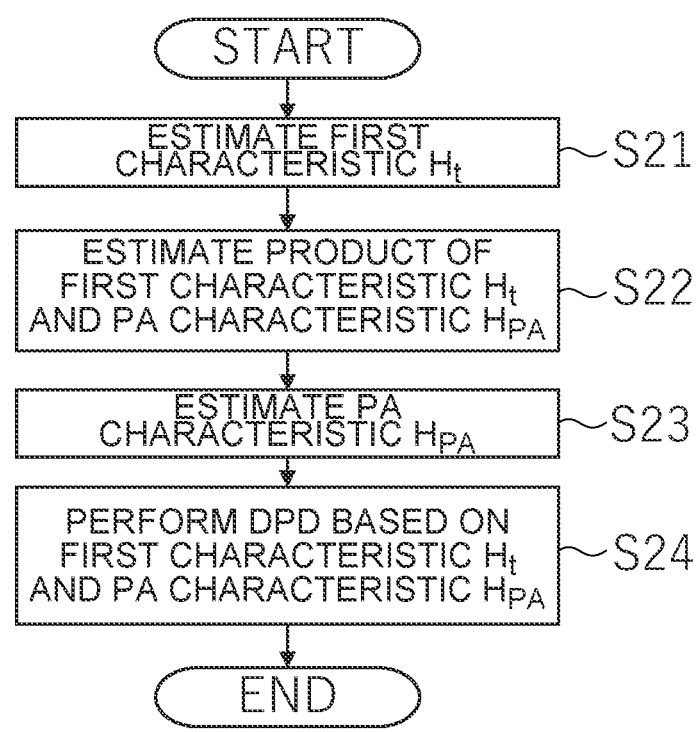
FIG. 9 is a flowchart describing a process performed by the signal processing apparatus according to the third embodiment.

FIG. 9 is a flowchart describing a process performed by the signal processing apparatus 1B. The process performed by the signal processing apparatus 1B will be described below with reference to FIG. 9.

First, the switch device 10 switches the connection to the input side of the PA 9 to disable the output from the PA 9 from being fed back and the distortion estimator 6 estimates the first characteristic $H_t$ (step S21). Step S21 includes steps S11 to S15.

Next, the switch device 10 switches the connection to the output side of the PA 9 to allow the output from the PA 9 to be fed back and the distortion estimator 6 estimates the product of the first characteristic $H_t$ and the PA characteristic $H_{PA}$ (step S22).

Next, the distortion estimator 6 estimates the PA characteristic $H_{PA}$ based on the product of the first characteristic $H_t$ and the PA characteristic $H_{PA}$ as well as on the first characteristic $H_t$ (step S23).

Next, based on the estimated first characteristic $H_t$ and PA characteristic $H_{PA}$, the distortion compensator 7 performs DPD to compensate the digital signal generated by the signal generator 2 for distortion (step S24).

Thus, the third embodiment allows DPD to be performed for a power amplifier regardless of signal bands.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments as described before may be configured as below.

CLAUSES

Clause 1. An electronic apparatus comprising:
- a signal generating circuitry configured to generate a first signal and a second signal;
- a first characteristic circuitry configured to acquire a first distorted signal by giving a first distortion characteristic to the first signal, and acquire a second distorted signal by giving the first distortion characteristic to the second signal;
- a first time-characteristic circuitry configured to acquire a third distorted signal by giving a first time-characteristic, which is a distortion characteristic that changes with time, to the first distorted signal and acquire a fourth distorted signal by giving a second time-characteristic, which is different from the first time-characteristic and is a distortion characteristic that changes with time, to the second distorted signal;
- a second characteristic circuitry configured to acquire a fifth distorted signal by giving a second distortion characteristic to the third distorted signal, and acquire a sixth distorted signal by giving the second distortion characteristic to the fourth distorted signal; and
- a processing circuitry configured to estimate at least one of the first distortion characteristic and the second distortion characteristic based on the first signal, the second signal, the fifth distorted signal, and the sixth distorted signal.

Clause 2. The electronic apparatus according to clause 1, wherein the processing circuitry at least either:
- estimates the first distortion characteristic by canceling the second distortion characteristic through a first arithmetic operation based on the first signal, the second signal, the fifth distorted signal, and the sixth distorted signal; or
- estimates the second distortion characteristic by canceling the first distortion characteristic through a second arithmetic operation based on the first signal, the second signal, the fifth distorted signal, and the sixth distorted signal.

Clause 3. The electronic apparatus according to clause 2, wherein the processing circuitry:
- estimates the first distortion characteristic based on an eigenvector of a signal, of which the second distortion characteristic is canceled; or
- estimates the second distortion characteristic based on an eigenvector of a signal, of which the first distortion characteristic is canceled.

Clause 4. The electronic apparatus according to any one of clauses 1 to 3, wherein:
- the first distortion characteristic causes linear distortion on a frequency axis to the first signal and the second signal; and
- the second distortion characteristic causes linear distortion on the frequency axis to the third distorted signal and the fourth distorted signal.

Clause 5. The electronic apparatus according to clause 4, wherein:
- the first distortion characteristic applies an affine transformation to the first signal and the second signal on the frequency axis; and
- the second distortion characteristic applies an affine transformation to the third distorted signal and the fourth distorted signal on the frequency axis.

Clause 6. The electronic apparatus according to any one of clauses 1 to 5, wherein at least one of the first distortion characteristic and the second distortion characteristic includes an IQ imbalance.

Clause 7. The electronic apparatus according to any one of clauses 1 to 6, wherein:
- the first time-characteristic changes, with time, at least one of a phase, an amplitude, a frequency, and an impulse response of the first distorted signal; and
- the second time-characteristic changes, with time, at least one of a phase, an amplitude, a frequency, and an impulse response of the second distorted signal.

Clause 8. The electronic apparatus according to any one of clauses 1 to 7, wherein:
- the first distortion characteristic and the second distortion characteristic change with time; and
- amounts of change in the first distortion characteristic and the second distortion characteristic per unit time are smaller than amounts of change in the first time-characteristic and the second time-characteristic per unit time.

Clause 9. The electronic apparatus according to any one of clauses 1 to 8, wherein:
- the first time-characteristic circuitry includes a plurality of pieces of equipment each of which changes at least one of a phase, an amplitude, a frequency, and an impulse response of a signal inputted to the first time-characteristic circuitry; and
- the first time-characteristic circuitry switches among the plurality of pieces of equipment with time, thereby giving the first time-characteristic to the first distorted signal and giving the second time-characteristic to the second distorted signal.

Clause 10. The electronic apparatus according to any one of clauses 1 to 9, wherein:
- the first time-characteristic circuitry includes a frequency converter;
- the frequency converter changes, with time, a frequency shift amount given to the first distorted signal, thereby giving the first time-characteristic to the first distorted signal, and changes, with time, a frequency shift amount given to the second distorted signal, thereby giving the second time-characteristic to the second distorted signal; and
- the frequency converter is part of the second characteristic circuitry.

Clause 11. The electronic apparatus according to clause 10, wherein the frequency converter is a mixer.

Clause 12. The electronic apparatus according to clause 11, wherein the mixer frequency-converts a radio signal from an RF band to a BB band.

Clause 13. The electronic apparatus according to clause 11, wherein the first time-characteristic circuitry includes a local oscillator configured to generate a local oscillation signal used by the mixer for frequency conversion, and noise changing with time is added to the local oscillation signal generated by the local oscillator, thereby giving the first time-characteristic to the first distorted signal and giving the second time-characteristic to the second distorted signal.

Clause 14. The electronic apparatus according to clause 7, wherein the first time-characteristic circuitry includes an amplifier and changes at least one of the phase, the amplitude, the frequency, and the impulse response with time using the amplifier.

Clause 15. The electronic apparatus according to clause 1, wherein:
- between the first time-characteristic circuitry and the second characteristic circuitry, one or more different Mth characteristic circuitries (M is an integer equal to or larger than 3) and one or more different Pth time-characteristic circuitries (P is an integer equal to or larger than 2) are at least partially provided alternately;
- the first characteristic circuitry outputs two signals, namely the first distorted signal and the second distorted signal, to the first time-characteristic circuitry, and the first time-characteristic circuitry outputs two signals, namely the third distorted signal and the fourth distorted signal, to the Mth characteristic circuitry on an output side of the first time-characteristic circuitry;
- the Mth characteristic circuitry gives an Mth distortion characteristic to the two distorted signals inputted from the first time-characteristic circuitry on an input side of the Mth characteristic circuitry or from the Pth time-characteristic circuitry and thereby output the two distorted signals to the Pth time-characteristic circuitry on an output side of the Mth characteristic circuitry, and the Pth time-characteristic circuitry give time characteristic, which are distortion characteristic differing from each other and changing with time, to two distorted signals inputted from the Mth characteristic circuitry on a input side of the Pth time-characteristic circuitry and outputs the two distorted signals to the Mth characteristic circuitry on the output side or to the second characteristic circuitry; and
- the processing circuitry switches a time-characteristic circuitry whose function is to be stopped among the one or more different Pth time-characteristic circuitries and the first time-characteristic circuitry and thereby estimates the Mth distortion characteristic of at least one of the one or more different Mth characteristic circuitries.

Clause 16. The electronic apparatus according to any one of clauses 1 to 15, wherein at least one of the first characteristic circuitry and the second characteristic circuitry includes one or more filters configured to attenuate a signal having any frequency component, and the filters give the first distortion characteristic and the second distortion characteristic.

Clause 17. The electronic apparatus according to any one of clauses 1 to 16, wherein:
- the first signal differs in frequency band from the fifth distorted signal; and
- the second signal differs in frequency band from the sixth distorted signal.

Clause 18. The electronic apparatus according to any one of clauses 1 to 17, further comprising:
- an amplifier connected to an output of the first characteristic circuitry and configured to amplify a signal; and
- a selecting circuitry configured to connect an input of the first time-characteristic circuitry selectively to any one of an input and an output of the amplifier,
- wherein the processing circuitry:
  - estimates the first distortion characteristic by connecting the selecting circuitry to the input of the amplifier, and
  - connects the selecting circuitry to the output of the amplifier, inputs a seventh distorted signal and an eighth distorted signal to the first time-characteristic circuitry, the seventh distorted signal resulting from giving the first distortion characteristic and a characteristic of the amplifier to the first signal, the eighth distorted signal resulting from giving the first distortion characteristic and the characteristic of the amplifier to the second signal, thereby estimates a product of the first distortion characteristic and the characteristic of the amplifier, and estimates the characteristic of the amplifier based on the estimated product and the estimated first distortion characteristic.

Clause 19. The electronic apparatus according to clause 18, further comprising:
- a distortion compensation circuitry configured to compensate a third signal generated by the signal generating circuitry for distortion, based on the first distortion characteristic and the characteristic of the amplifier, the first distortion characteristic and the amplifier characteristic being estimated by the processing circuitry; and
- an output circuitry configured to output a signal resulting from the third signal compensated by the distortion compensation circuitry, then given the first distortion characteristic by the first characteristic circuitry, and amplified by the amplifier.

Clause 20. The electronic apparatus according to clause 19, wherein the output circuitry includes an antenna configured to transmit a radio wave based on the signal.

Clause 21. A signal processing method comprising:
- generating a first signal and a second signal;
- acquiring a first distorted signal by giving a first distortion characteristic to the first signal, and acquiring a second distorted signal by giving the first distortion characteristic to the second signal;
- acquiring a third distorted signal by giving a first time-characteristic, which is a distortion characteristic that changes with time, to the first distorted signal and acquiring a fourth distorted signal by giving a second time-characteristic, which is different from the first time-characteristic and is a distortion characteristic that changes with time, to the second distorted signal;
- acquiring a fifth distorted signal by giving a second distortion characteristic to the third distorted signal, and acquiring a sixth distorted signal by giving the second distortion characteristic to the fourth distorted signal; and estimating at least one of the first distortion characteristic and the second distortion characteristic based on the first signal, the second signal, the fifth distorted signal, and the sixth distorted signal.

The invention claimed is:

1. An electronic apparatus comprising:
a signal generating circuitry configured to generate a first signal and a second signal;
a first characteristic circuitry configured to acquire a first distorted signal by giving a first distortion characteristic to the first signal, and acquire a second distorted signal by giving the first distortion characteristic to the second signal;
a first time-characteristic circuitry configured to acquire a third distorted signal by giving a first time-characteristic, which is a distortion characteristic that changes with time, to the first distorted signal and acquire a fourth distorted signal by giving a second time-characteristic, which is different from the first time-characteristic and is a distortion characteristic that changes with time, to the second distorted signal;
a second characteristic circuitry configured to acquire a fifth distorted signal by giving a second distortion characteristic to the third distorted signal, and acquire a sixth distorted signal by giving the second distortion characteristic to the fourth distorted signal; and
a processing circuitry configured to estimate at least one of the first distortion characteristic and the second distortion characteristic based on the first signal, the second signal, the fifth distorted signal, and the sixth distorted signal.

2. The electronic apparatus according to claim 1, wherein the processing circuitry at least either:
estimates the first distortion characteristic by canceling the second distortion characteristic through a first arithmetic operation based on the first signal, the second signal, the fifth distorted signal, and the sixth distorted signal; or
estimates the second distortion characteristic by canceling the first distortion characteristic through a second arithmetic operation based on the first signal, the second signal, the fifth distorted signal, and the sixth distorted signal.

3. The electronic apparatus according to claim 2, wherein the processing circuitry:
estimates the first distortion characteristic based on an eigenvector of a signal, of which the second distortion characteristic is canceled; or
estimates the second distortion characteristic based on an eigenvector of a signal, of which the first distortion characteristic is canceled.

4. The electronic apparatus according to claim 1, wherein:
the first distortion characteristic causes linear distortion on a frequency axis to the first signal and the second signal; and
the second distortion characteristic causes linear distortion on the frequency axis to the third distorted signal and the fourth distorted signal.

5. The electronic apparatus according to claim 4, wherein:
the first distortion characteristic applies an affine transformation to the first signal and the second signal on the frequency axis; and
the second distortion characteristic applies an affine transformation to the third distorted signal and the fourth distorted signal on the frequency axis.

6. The electronic apparatus according to claim 1, wherein at least one of the first distortion characteristic and the second distortion characteristic includes an IQ imbalance.

7. The electronic apparatus according to claim 1, wherein:
the first time-characteristic changes, with time, at least one of a phase, an amplitude, a frequency, and an impulse response of the first distorted signal; and
the second time-characteristic changes, with time, at least one of a phase, an amplitude, a frequency, and an impulse response of the second distorted signal.

8. The electronic apparatus according to claim 1, wherein:
the first distortion characteristic and the second distortion characteristic change with time; and
amounts of change in the first distortion characteristic and the second distortion characteristic per unit time are smaller than amounts of change in the first time-characteristic and the second time-characteristic per unit time.

9. The electronic apparatus according to claim 1, wherein:
the first time-characteristic circuitry includes a plurality of pieces of equipment each of which changes at least one of a phase, an amplitude, a frequency, and an impulse response of a signal inputted to the first time-characteristic circuitry; and
the first time-characteristic circuitry switches among the plurality of pieces of equipment with time, thereby giving the first time-characteristic to the first distorted signal and giving the second time-characteristic to the second distorted signal.

10. The electronic apparatus according to claim 1, wherein:
the first time-characteristic circuitry includes a frequency converter;
the frequency converter changes, with time, a frequency shift amount given to the first distorted signal, thereby giving the first time-characteristic to the first distorted signal, and changes, with time, a frequency shift amount given to the second distorted signal, thereby giving the second time-characteristic to the second distorted signal; and
the frequency converter is part of the second characteristic circuitry.

11. The electronic apparatus according to claim 10, wherein the frequency converter is a mixer.

12. The electronic apparatus according to claim 11, wherein the mixer frequency-converts a radio signal from an RF band to a BB band.

13. The electronic apparatus according to claim 11, wherein the first time-characteristic circuitry includes a local oscillator configured to generate a local oscillation signal used by the mixer for frequency conversion, and noise changing with time is added to the local oscillation signal generated by the local oscillator, thereby giving the first time-characteristic to the first distorted signal and giving the second time-characteristic to the second distorted signal.

14. The electronic apparatus according to claim 7, wherein the first time-characteristic circuitry includes an amplifier and changes at least one of the phase, the amplitude, the frequency, and the impulse response with time using the amplifier.

15. The electronic apparatus according to claim 1, wherein:
between the first time-characteristic circuitry and the second characteristic circuitry, one or more different Mth characteristic circuitries (M is an integer equal to or larger than 3) and one or more different Pth time-characteristic circuitries (P is an integer equal to or larger than 2) are at least partially provided alternately;

the first characteristic circuitry outputs two signals, namely the first distorted signal and the second distorted signal, to the first time-characteristic circuitry, and the first time-characteristic circuitry outputs two signals, namely the third distorted signal and the fourth distorted signal, to the Mth characteristic circuitry on an output side of the first time-characteristic circuitry;

the Mth characteristic circuitry gives an Mth distortion characteristic to the two distorted signals inputted from the first time-characteristic circuitry on an input side of the Mth characteristic circuitry or from the Pth time-characteristic circuitry and thereby outputs the two distorted signals to the Pth time-characteristic circuitry on an output side of the Mth characteristic circuitry, and the Pth time-characteristic circuitry gives time characteristic, which are distortion characteristic differing from each other and changing with time, to two distorted signals inputted from the Mth characteristic circuitry on a input side of the Pth time-characteristic circuitry and outputs the two distorted signals to the Mth characteristic circuitry on the output side or to the second characteristic circuitry; and the processing circuitry switches a time-characteristic circuitry whose function is to be stopped among the one or more different Pth time-characteristic circuitry and the first time-characteristic circuitry and thereby estimates the Mth distortion characteristic of at least one of the one or more different Mth characteristic circuitries.

16. The electronic apparatus according to claim 1, wherein at least one of the first characteristic circuitry and the second characteristic circuitry includes one or more filters configured to attenuate a signal having any frequency component, and the filters give the first distortion characteristic and the second distortion characteristic.

17. The electronic apparatus according to claim 1, wherein:
the first signal differs in frequency band from the fifth distorted signal; and
the second signal differs in frequency band from the sixth distorted signal.

18. The electronic apparatus according to claim 1, further comprising:
an amplifier circuitry connected to an output of the first characteristic circuitry and configured to amplify a signal; and
a selecting circuitry configured to connect an input of the first time-characteristic circuitry selectively to any one of an input and an output of the amplifier circuitry, wherein the processing circuitry:
estimates the first distortion characteristic by connecting the selecting circuitry to the input of the amplifier circuitry, and
connects the selecting circuitry to the output of the amplifier circuitry, inputs a seventh distorted signal and an eighth distorted signal to the first time-characteristic circuitry, the seventh distorted signal resulting from giving the first distortion characteristic and a characteristic of the amplifier circuitry to the first signal, the eighth distorted signal resulting from giving the first distortion characteristic and the characteristic of the amplifier circuitry to the second signal, thereby estimates a product of the first distortion characteristic and the characteristic of the amplifier circuitry, and estimates the characteristic of the amplifier circuitry based on the estimated product and the estimated first distortion characteristic.

19. The electronic apparatus according to claim 18, further comprising:
a distortion compensating circuitry configured to compensate a third signal generated by the signal generating circuitry for distortion, based on the first distortion characteristic and the characteristic of the amplifier circuitry, the first distortion characteristic and the amplifier circuitry characteristic being estimated by the processing circuitry; and
an output circuitry configured to output a signal resulting from the third signal compensated by the distortion compensation circuitry, then given the first distortion characteristic by the first characteristic circuitry, and amplified by the amplifier circuitry.

20. The electronic apparatus according to claim 19, wherein the output circuitry includes an antenna configured to transmit a radio wave based on the signal.

21. A signal processing method comprising:
generating a first signal and a second signal;
acquiring a first distorted signal by giving a first distortion characteristic to the first signal, and acquiring a second distorted signal by giving the first distortion characteristic to the second signal;
acquiring a third distorted signal by giving a first time-characteristic, which is a distortion characteristic that changes with time, to the first distorted signal and acquiring a fourth distorted signal by giving a second time-characteristic, which is different from the first time-characteristic and is a distortion characteristic that changes with time, to the second distorted signal;
acquiring a fifth distorted signal by giving a second distortion characteristic to the third distorted signal, and acquiring a sixth distorted signal by giving the second distortion characteristic to the fourth distorted signal; and
estimating at least one of the first distortion characteristic and the second distortion characteristic based on the first signal, the second signal, the fifth distorted signal, and the sixth distorted signal.

* * * * *